US008128126B2

(12) United States Patent
Poupore et al.

(10) Patent No.: US 8,128,126 B2
(45) Date of Patent: Mar. 6, 2012

(54) DEVICE AND METHOD FOR COUPLING A CONDUIT (75) Inventors: Timothy J. Poupore, Toronto (CA); Eric Leclerc Boutin, Vaudreuil-Dorion (CA); Younes Youssef, Montreal (CA)

(73) Assignee: IPEX Technologies Inc., Mississauga, Ontario (CA)

( * ) Notice: Subject to any disclaimer, the term of this patent is extended or adjusted under 35 U.S.C. 154(b) by 754 days.

(21) Appl. No.: 11/826,526

(22) Filed: Jul. 16, 2007

(65) Prior Publication Data

US 2009/0021003 A1 Jan. 22, 2009

(51) Int. Cl.
*F16L 39/00* (2006.01)
(52) U.S. Cl. .................. 285/131.1; 285/373
(58) Field of Classification Search ............ 285/131.1, 285/70, 73, 79, 65, 373, 419, 903; 174/71 R, 174/72 A, 72 C
See application file for complete search history.

(56) References Cited

U.S. PATENT DOCUMENTS

| | | | |
|---|---|---|---|
| 1,755,899 A | 4/1930 | Root | |
| D180,353 S | 5/1957 | Benson | |
| 2,891,101 A | 6/1959 | Koliss | |
| 2,908,744 A | 10/1959 | Bollmeier | |
| 2,923,762 A | 2/1960 | Falkenstein | |
| 3,204,481 A | 9/1965 | Golden | |
| D214,906 S | 8/1969 | Steinmeyer | |
| 3,519,731 A | 7/1970 | Grundbaum | |
| 3,711,633 A * | 1/1973 | Ghirardi et al. | 174/135 |
| 3,715,459 A | 2/1973 | Hoffman | |
| 3,836,694 A | 9/1974 | Kapell | |
| 3,845,414 A | 10/1974 | McKenzie | |
| 3,874,760 A | 4/1975 | Guthmiller | |
| 3,983,314 A | 9/1976 | Filhaber | |
| 3,992,569 A | 11/1976 | Hankins | |
| 4,232,184 A | 11/1980 | Faust | |
| 4,431,198 A | 2/1984 | Beinhaur | |
| D278,623 S | 4/1985 | Anderson | |
| 4,797,512 A * | 1/1989 | Kumagai et al. | 174/135 |
| 4,854,665 A * | 8/1989 | Gagnon | 385/100 |
| 4,883,919 A | 11/1989 | Abele | |
| 4,994,630 A | 2/1991 | Schilling | |
| 5,024,249 A | 6/1991 | Botsolas | |
| D326,257 S | 5/1992 | Lee | |
| 5,243,136 A | 9/1993 | Chen | |
| 5,266,741 A | 11/1993 | Butler | |
| 5,726,388 A | 3/1998 | Ferland | |
| 5,816,853 A * | 10/1998 | Buekers et al. | 439/521 |
| 5,844,171 A | 12/1998 | Fitzgerald | |
| D438,510 S | 3/2001 | Leen | |
| 6,619,697 B2 | 9/2003 | Griffioen | |
| 6,880,219 B2 | 4/2005 | Griffioen | |
| 7,044,761 B2 | 5/2006 | Sokol | |
| 7,102,194 B2 | 9/2006 | Huang et al. | |
| 7,378,592 B2 * | 5/2008 | Suzuki et al. | 174/72 A |

* cited by examiner

*Primary Examiner* — Aaron Dunwoody

(57) ABSTRACT

A coupling device formed of two identical sides is disclosed. Each of the two sides have a snap fitting mechanism which engage each other to releasably secure the sides together thereby forming the coupling device. The coupling device as formed has a main body communicating with at least two openings. Each opening is sized to engage an end of a corresponding conduit. Generally, the conduits are corrugated such that the openings engage one corrugation to form the friction fit. The openings may be conically shaped with pre-scored cut lines that can be cut at different diameters to engage conduits of different diameters. The openings of the coupling device have pre-score cut lines that may be cut in order to create the friction fit with corrugated conduits having different diameters.

21 Claims, 10 Drawing Sheets

Section A

FIG. 7b

Section B

DEVICE AND METHOD FOR COUPLING A CONDUIT

FIELD OF THE INVENTION

This invention relates to a device and method for coupling conduits. More particularly, the invention relates to a coupling device and method for using same to couple together two or more conduits, such as used in risers and plenums.

BACKGROUND OF THE INVENTION

With the evolution of today's integrated network environments in both homes and businesses, the design of a building's cabling infrastructure has become more demanding than ever before. Not only has system performance become critical, but consumers now demand mobility and flexibility, while maintaining low installation and maintenance costs.

As technology continues to evolve and traditional optical fibre and communications cabling methods become obsolete, designing or retrofitting buildings with optical fibre and communication cable raceways has become more common. This combines compliance with fire, building and electrical code requirements with the demands of users to be both flexible and up-to-date with technology.

Over the past few years, there has been a dramatic evolution of voice and data communications systems and an increase in the routing of voice/data cable in air handling plenums. At the same time, air handling plenums have become more common with the advent of integrated heating, ventilation and air conditioning (HVAC). In general, plenums are commonly referred to as the space above the ceiling used for air management and may be considered as compartments or chambers to which one or more ducts are connected and that may form part of the air distribution system. The plenum space may also be used typically to house communication and fibre optic cables for holding wires, cables or busbars. From a fire safety perspective, air handling plenums present unique challenges to the prevention and migration of fire and smoke because they usually involve large open spaces that interconnect different parts of a building. If not constructed of the right type of materials, fire and smoke can move easily to portions of the building that are remote from the area in which a fire may have started.

In most buildings, the electrical, plumbing and HVAC services start on either the main floor or the lowest floor and are distributed throughout the building in vertical and horizontal shafts. Within a single storey, these services are typically run through the horizontal space above ceiling tiles or drywall, or beneath the finish flooring, which are generally referred to as plenums as discussed above. Similarly, building codes typically identify vertical shafts that house all of the building services and interconnect the stories of a building as a riser. As an example, telecommunication cabling typically enters the building at a common point or source such as the telephone room or equipment room, and from there, cabling is distributed throughout the building. In multi-storey buildings, risers are needed. In general, risers may be understood as a pathway to run cables, and other building services to pass from one floor to another, and, may comprise one or more conduits. In general, risers may be understood as a pathway to run cables, and other building services to pass from one floor to another. Risers may also be constructed so that they can prevent fire and smoke from moving from the storey that the fire originates on to other storeys within the building.

Furthermore, there has been a need for general use optical fibre cable and communication raceways which excludes risers, plenums and other spaces used for environmental air when they contain specific types of optical fibre cables. This type of raceway is resistant to the spread of fire when tested in accordance with various flame test requirements as set out by Underwriters Laboratories (UL) and Canadian Standards Association (CSA) as well as other standard testing organizations.

In the event of a fire, cables abandoned and left in the plenums can become a safety hazard to the occupants of a building by unnecessarily adding to the fuel load in the plenum. With the growth in the use of communication cable in recent years, the authoritative body of the codes and standards have recognized that some remedial action is necessary to prevent an accumulation of combustible materials in plenum spaces. Architects, designers, engineers and contractors installing cables in plenums now need to take code requirements regarding abandoned cable into account when designing new buildings and retrofitting older ones. The most convenient way to remove and replace a cable is to have it installed in a raceway. As technology continues to evolve and traditional optical fibre and communications cabling methods become obsolete, buildings designed or retrofitted with raceways will easily allow compliance with fire, building and electrical code requirements while, at the same time, being up-to-date with technology. In general, raceways may be considered channels for loosely holding cables and wires, both electrical, fibre optic, etc. in buildings. Raceways may be formed of one or more conduits that may be metallic or non-metallic through which cables may be pulled. Conduits may be circular, substantially circular or have other cross-sections. Conduits may also be corrugated. Conduits should not be filled beyond the limitations set out in fire, building and/or electrical codes.

However, simply inserting raceways into buildings does not provide the flexibility in which to accommodate the growing demands of technologies as well as changes in the fire, building and electrical code requirements. Furthermore, several existing buildings having raceways designated specifically for holding wires, cables or busbars, must be modified as time goes on and user needs change. While the prior art has permitted the development of new conduits to accommodate different design changes or modifications in building designs, this increases the cost of installation, as well as material costs greatly. For instance, in some prior art designs, multiple raceways may be needed to accommodate different cables. In this case, several individual raceways may emanate from a single pullbox thereby increasing the cost for installation as well as the material costs. Furthermore, this increases the complexity of the building's cabling infrastructure which makes later modifications more complex and costly. Alternate prior art designs have involved multiple pullboxes emanating from a single equipment room. In this case, multiple pullboxes would increase the cost of the installation because of the increased material costs and installation costs for each of the pullboxes.

Accordingly, there is a need in the art for a simple and robust method and device which can facilitate changes in the design of a building's cabling infrastructure while providing the mobility and flexibility consumers demand. Furthermore, there is a need in the art for a method and device which can facilitate such changes while maintaining low installation and maintenance costs.

SUMMARY OF THE INVENTION

Accordingly, it is an object of this invention to at least partially overcome some of the disadvantages of the prior art.

Also, in at least some aspects, this invention provides an improved device and method for facilitating installation and modification of cabling infrastructure in buildings.

Accordingly, in one of its aspects, this invention resides in a coupling device to couple conduits together, said coupling device comprising: a first side having a first snap fitting mechanism; a second side having a second snap fitting mechanism, said first snap fitting mechanism mating with the second snap fitting mechanism to releasably secure the first side to the second side and form the coupling device, said coupling device having a main body communicating with a first opening, a second opening and a third opening; wherein said first opening, second opening and third opening are each sized to engage an end of a corresponding conduit when the first side is releasably secured to the second side. In a further aspect, the present invention resides in a side of a coupling device, said side comprising: a snap fitting mechanism for mating with a corresponding snap fitting mechanism of a substantially identical other side of the coupling device; at least two substantially U-shaped channels; and wherein the snap fitting mechanism of the side mates with the corresponding snap fitting mechanism of the substantially identical other side to form the coupling device and the U-shaped channels of the side mate with corresponding U-shaped channels of the substantially identical other side to form at least two openings in the coupling device; and wherein the at least two openings are sized to engage a corresponding conduit when the snap fitting mechanism of the side mates with the corresponding snap fitting mechanism of the substantially identical other side.

In a still further aspect, the present invention resides in a method of coupling conduits, said method comprising: providing a first side of a coupling device, said first side having a first snap fitting mechanism and at least two U-shaped channels; placing in each U-shaped channel an end of a corresponding conduit; providing a second side of the coupling device, said second side having a second snap fitting mechanism which mates with the first snap fitting mechanism; and securing the first side to the second side by mating the first snap fit mechanism to the second snap fit mechanism to form the coupling device such that at least the two U-shaped channels of the first side mate with at least two channels of the second side to form at least two openings sized to engage the end of the corresponding conduits.

Accordingly, one of the advantages of at least some of the aspects of the invention comprises a coupling device having two sides which can be snap fitted together to facilitate installation and thereby decrease installation costs. Furthermore, in a preferred embodiment, the two sides may be identical which may decrease the manufacturing costs in that a single mold can be used to make both sides of the coupling device. This also may decrease the installation costs because users need only purchase and store one side of the coupling device which can then be used to create the coupling device. Furthermore, if one side of the coupling device is damaged, users need not purchase two new sides, but rather simply use one of the other identical sides. Furthermore, if the sides are identical, they may be more easily stacked for storage and transportation.

A further advantage of at least some embodiments of the present invention is that the coupling device, when installed, engages the conduits to hold it in place, such as by creating an interference fit with the conduit including a friction fit. In this way, additional elements, such as sleeves, screws, tapes or adhesives, or, more complicated coupling methods, are not required. Rather, the openings of the coupling device are sized to create an interference fit with the conduit. In cases where the conduit is a corrugated conduit, the openings are sized to engage the corrugated conduit by fitting into the outer diameter of one of the corrugated corrugations. In a still further preferred embodiment, the coupling device, when manufactured, may have conical openings with pre-scored cut lines that can be cut at different diameters. In this way, the conical ends can be cut to fit the outer diameter of a corrugation of the corrugated conduits having different diameters to engage the conduit such as through an interference fit or friction fit. This increases the versatility of the coupling device. This also facilitates use of the coupling device to retrofit existing cabling infrastructure which may have conduits of different sizes.

A further advantage of at least some embodiments of the present invention is that it is light weight. In particular, the coupling device can be manufactured from rigid plastic material, such as PVDF or PVC and other materials permitted for use in plenums and/or as raceways or risers. These materials are relatively light, but nevertheless meets applicable fire, building and electrical codes standards. Furthermore, because of the durability of this material, the thickness of the sides of the coupling device can be relatively thin, such as less than 0.5 inches, and more preferably, less than 0.25 inches and still more preferably between 0.05 to 0.2 inches, on average. Furthermore, the material having this thickness can be relatively resilient, which facilitates the snap fitting of the one side onto the other side.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
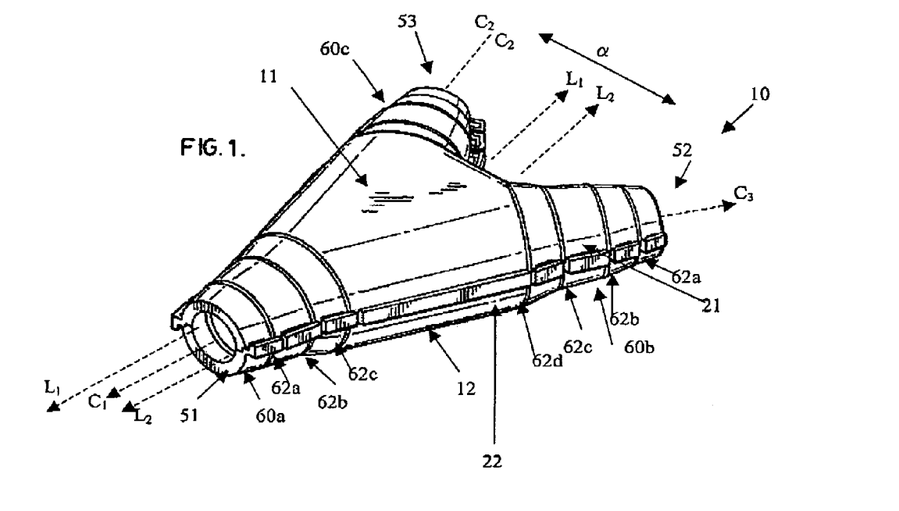
FIG. 1 is a top perspective view of one side of a splitable coupling device engaging an identical other side of the splitable coupler according to one preferred embodiment of the present invention.

As shown in FIG. 1, one embodiment of the present invention relates to a coupling device, shown generally by reference numeral 10, which can be used to couple together conduits shown generally as reference numeral 1 in FIGS. 8 to 11. While the coupling device 10 in FIG. 1 illustrates the preferred embodiment where the ends 4 of three conduits 1a, 1b, 1c are coupled together, it is understood that the coupling device 10 may have other embodiments for coupling together two, three, four or more conduits 1.

Figure 2:
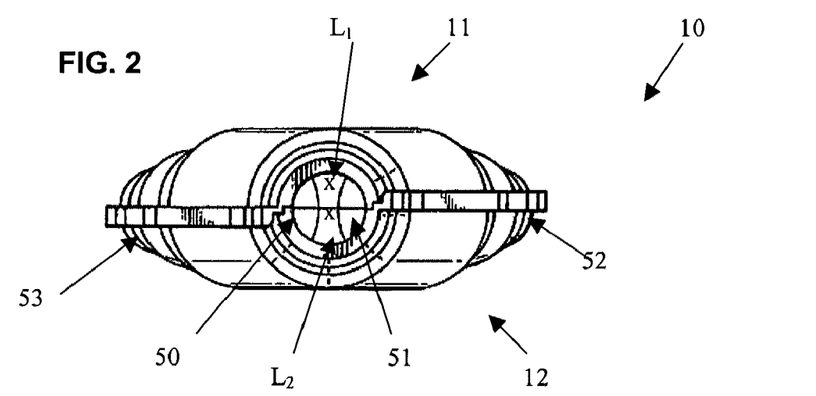
FIG. 2 is a front elevational view of the coupling device shown in FIG. 1.
Figure 3:
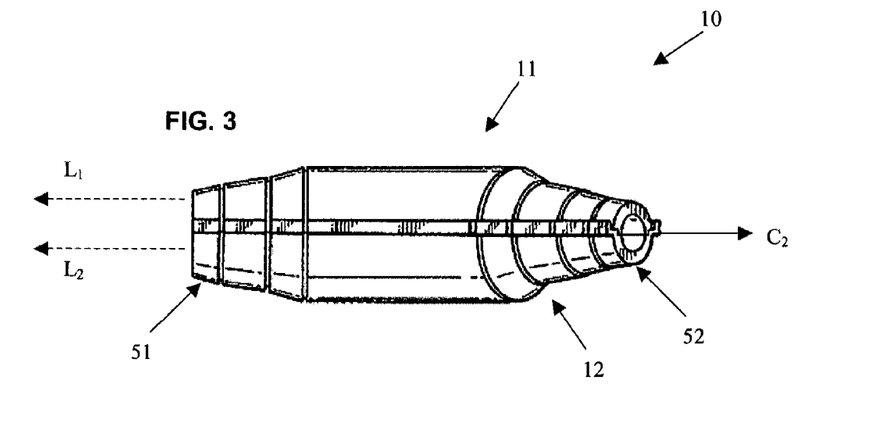
FIG. 3 is a left side elevational view of the coupling device shown in FIG. 1.
Figure 4:
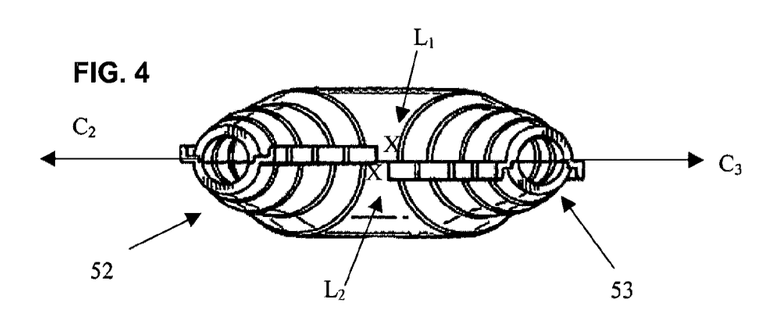
FIG. 4 is a rear elevational view of the coupling device shown in FIG. 1.

As illustrated in FIG. 1, as well as FIGS. 2, 3 and 4, the coupling device 10 according to one preferred embodiment, has a first side 11 with a snap fitting mechanism 21. The coupling device 10 also comprises a second side 12 having a second snap fitting mechanism 22. The first snap fitting mechanism 21 mates with the second snap fitting mechanism 22 to releasably secure the first side 11 to the second side 12 in order to form the coupling device 10 as shown, for instance, in FIGS. 1 to 4.

In a preferred embodiment, the first snap fitting mechanism 21 extends along at least a first portion 13 of the first perimeter 17 of the first side 11. Similarly, the second snap fitting mechanism 22 preferably extends along at least a second portion 14 of the second perimeter 18. In this way, when the first side 11 is releasably secured to the second side 12, the coupling device 10 has a main body 50 which communicates with the at least two openings 51, 52 and in the embodiment shown in FIGS. 1 to 4, the three openings 51, 52 and 53.

As also illustrated in FIGS. 1 to 4, the first opening 51, second opening 52 and third opening 53 have centre lines $C_1$, $C_2$ and $C_3$, respectively. This is illustrated in FIGS. 1 to 4. During operation, the corresponding conduits 1 are fitted into the openings 51, 52, 53 and the openings 51, 52, 53 are each sized to engage the corresponding conduit 1 when the first side 11 is releasably secured to the second side 12. This is illustrated, for instance, in FIG. 11, which shows the coupling device 10 having the first side 11 releasably secured to the second side 12 and each of the openings 51, 52 and 53 engaging the corresponding conduit 1a, 1b and 1c.

Preferably the openings 51, 52, 53 engage the corresponding conduit 1 by creating a friction fit where the openings 51, 52, 53 frictionally hold the corresponding conduit 1 in place. In a still further preferred embodiment, the openings 51, 52, 53 engage the corresponding conduits 1 by creating an interference fit, such as by having ribs 56 or other protuberances on the openings 51, 52, 53 engage the conduit 1, and in the case of corrugated conduits 2, engage one of the corrugation 3. It is understood that in this context, an interference fit is a particular type of friction fit involving both friction and an interlocking of 2 elements, such as the openings 51, 52, 53 with the corrugations 3 on the corrugated conduits.

The first side 11 preferably extends along a first longitudinal axis, as shown generally by dashed line $L_1$ in FIGS. 1 and 3 and by the letter "X" in FIGS. 2 and 4 showing the longitudinal axis $L_1$ moving into the page. Similarly, in a preferred embodiment, the second side 12 extends along a second longitudinal axis $L_2$, as shown in FIGS. 1 and 3 by the dashed line L2 and shown in FIGS. 2 and 4 by the letter "X" representing that the second longitudinal axis $L_2$ moves into the page. In a preferred embodiment, the first snap fitting mechanism 21 mates with the second snap fitting mechanism 22, when the first longitudinal axis $L_1$ is substantially aligned with the second longitudinal axis $L_2$ as shown, for instance, in FIGS. 1 to 4. In this configuration, the first opening 51 has a first centre line $C_1$ which extends into the main body 50 and is substantially aligned with the first longitudinal axis $L_1$ and the second longitudinal axis $L_2$ as illustrated best in FIG. 1. As also illustrated in FIGS. 1, 3 and 4, the second opening 52 and the third opening 53 each have a centre line $C_2$, $C_3$, respectively, which also extend into the main body 50. The second centre line $C_2$ and the third centre line $C_3$ preferably form an acute angle α with respect to the first longitudinal axis $L_1$ and the second longitudinal axis $L_2$ as shown best in FIG. 1.

Preferably, during installation, when a number of coupling devices 10 are connected to the same riser or raceway (not shown), each of the coupling devices 10 are preferably aligned in the same way with the centre line $C_1$ of the first opening 51 of each coupling device 10 extending in the same direction along the same raceway (not shown). In this way, the acute angle α will assist in pulling cables and other wires (not shown) into first opening 51 and out of the respective openings 52 and 53 of the coupling device 10 and the other coupling devices (not shown) connected to the same raceway (not shown) because the angle α is an acute angle and will be oriented in the same way for all of the coupling devises 10 connected to the same raceway (not shown).

As also illustrated in FIGS. 1 to 4, when the first side 11 is releasably secured to the second side 12, the coupling device 10 is substantially symmetrical about the first longitudinal axis $L_1$ and the second longitudinal axis $L_2$. As also illustrated in FIGS. 1 to 4, as well as FIGS. 5 and 6, the first side 11 is preferably substantially identical to the second side 12. In this way, only a single type of side 11, 12 need be manufactured which decreases the manufacturing costs and the mould cost. Furthermore, the user need only have one type of side 11, 12 in order to form the coupling device 10 because the two sides 11, 12 are identical and can be fitted together to form the coupling device 10. Furthermore, identical sides 11, 12 may more easily stack together for transport and storage.

Figure 5:
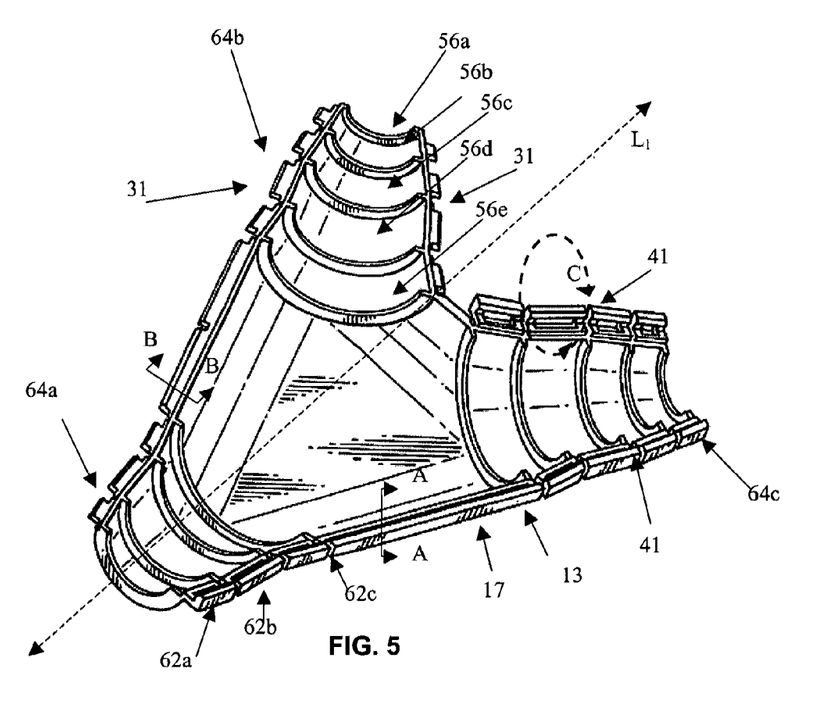
FIG. 5 is a top perspective view of the first side of the coupling device shown in FIG. 2 according to one preferred embodiment.

FIG. 5 shows a view of the inside of the first side 11. As illustrated in FIG. 5, the first snap fitting mechanism 21 preferably comprises a first plurality of ribs 31 on one side of the first longitudinal axis $L_1$ and preferably comprises a first plurality of slots 41 on the other side of the first longitudinal axis $L_1$. The first side 11 also comprises U-shaped channels 64a, 64b, 64c which, when mated with corresponding U-shaped channels 66a, 66b, 66c in the second side 12 (shown better in FIG. 6), will form the first, second and third openings 51, 52, 53. Furthermore, having the first snap fitting mechanism 21 comprising the plurality of ribs 31 on one side of the first longitudinal axis L1 and the plurality of slots 41 on the other side of the first longitudinal axis L2, facilitates having the first side 11 substantially identical to the second side 12. This is the case, at least, because when the two side 11, 12 are aligned along their respective longitudinal axes $L_1$, $L_2$, the first plurality of ribs 31 of the first snap fitting mechanism 11 will mate with the corresponding second plurality of slots 42 of the second side 12 and the first plurality of slots 41 of the first side will mate with the corresponding second plurality of ribs 32 on the second side 12.

Preferably, the first side 11 and/or second side 12 are made of the same material. More preferably, the sides 12, 14 are made from rigid plastic material, such as PVDF and/or PVC. This type of material is permitted under the corresponding fire, building and electrical codes for raceways and risers. It is understood that the other materials permitted for use in plenums, and/or raceways or risers would also be acceptable. Furthermore, in a preferred embodiment, the sides, 11, 12 will have a thickness of less than 0.5 inches and, more preferably, less than 0.25 inches and still more preferably, less than 0.05 to 0.2 inches, on average. Having this type of thickness would give at least the first side 11 and preferably both sides 11, 12 sufficient resiliency. This may make the side 11, 12 more durable. This may also permit the sides 11, 12 to be able to slightly deform so as to more easily permit the first plurality of ribs 31 to mate with the first plurality of slots 41 and to permit the second plurality of ribs 32 to mate with the first plurality of slots 41. Furthermore, this type of material and this type of structure will permit the coupling device 10 to be used to couple various conduits 1 in a building's cabling infrastructure, such as plenum, riser or general raceway applications. Using the coupling device 10 of the present invention, in one preferred embodiment, a single raceway can be used to have a number of different cables pulled through with the raceway being split off where needed to service individual locations. Cables can also easily be pulled through the conduits 1 and through the coupling devices 10. Furthermore, abandoned cables can be put in raceways and dealt with in a more efficient manner using the coupling devices 10.

Figure 7A:
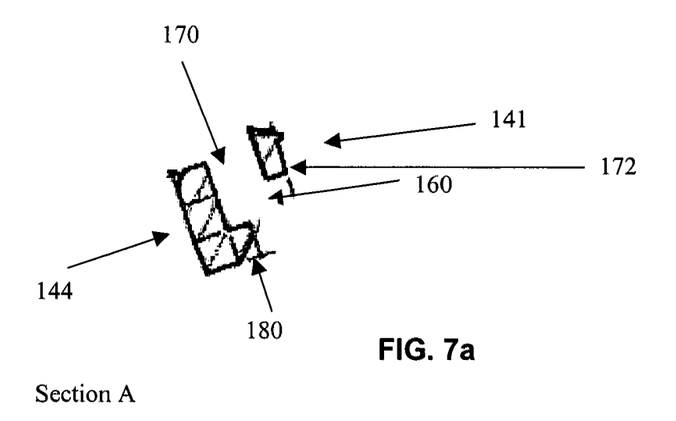
FIG. 7a is a section taken along lines A-A of FIG. 5.

FIG. 7a shows a section along line A of FIG. 5 showing one slot 141 of the first plurality of slots 41 of the first side 11, in more detail. As shown in FIG. 7a, the slot 141 preferably comprises an opening 160, for receiving a corresponding one of the second plurality of ribs 32 of the second side 12, in this case. The slot 141 is formed by the slot frame 144 which has a retaining surface 170 adjacent to an inclined surface 180. The slot 141 also has a support surface 172.

Figure 7B:
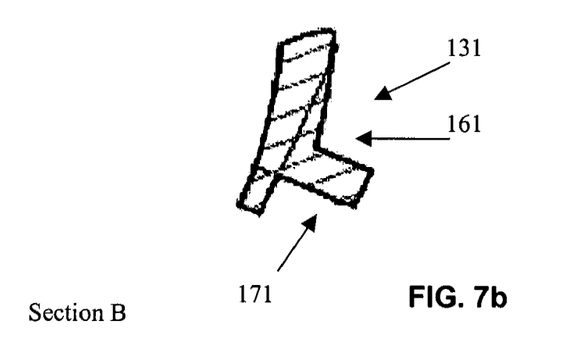
FIG. 7b is a section taken along lines B-B of FIG. 5.

A rib 131 is illustrated in more detail in FIG. 7b which shows a section along line B of FIG. 5. The rib 131 has an extension 161 which fits into a corresponding opening 160. It is understood that the sections A and B shown in FIGS. 7a and 7b are taken from the first side 11 shown in FIG. 5, however in cases where the first side 11 is identical to the second side 12, it is understood that the rib 131 shown in FIG. 7b from first side 11 would mate with the corresponding slot 141 shown in FIG. 7a from a second side 12. In this case, the rib extension 161 having a rib extension surface 171 would bear against the slot frame 141 and in particular the slot incline surface 180, thereby causing the slot frame 144 to flex or rotate outwards. Preferably, as least the slot frame 140 is made of sufficiently resilient material to permit relative movement so that the rib extension 161 may be inserted past the incline surface 180 and into the opening 160. This action may generate a snapping sound. At this point, the rib extension 161 will have been inserted into the opening 160 and the rib extension surface 171 will come to rest against the slot support surface 172. In this position, slot retaining surface 170 will rest along the rib extension surface 171 of the rib 131, thereby holding the rib 131 in place. When the first side 11 is to be separated from the second side 12, the first side 11 and/or second side 12 are manipulated such that the rib extension 161 of the rib 131 is disengaged from the slot retaining surface 170 of the slot 141 so as to permit removal of the rib extension 161 from the opening 160. In this way, the first side 11 may be releasably secured to the second side 12 using the first snap fit mechanism 21 and the second snap fit mechanism 22, where in the preferred embodiment, the first snap fit mechanism 21 and the second snap fit mechanism 23 comprise a plurality of rib 31 and 32 and the plurality of slots 41 and 42.

Figure 7C:
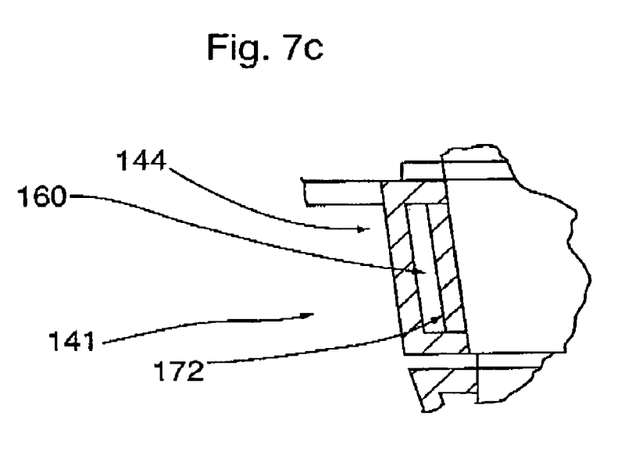
FIG. 7c is a detail taken doing line C of C shown in FIG. 5 of one slot according to one preferred embodiment of the present invention.

FIG. 7c shows the slot 141 in more detail taken along the line C in FIG. 5. As illustrated in FIG. 7c, the slot 141 has the opening 160, the slot support surface 172 and the slot frame 144 which have the functions as described above. The slot retaining surface 170 is not shown in the view of FIG. 7C.

Figure 8:
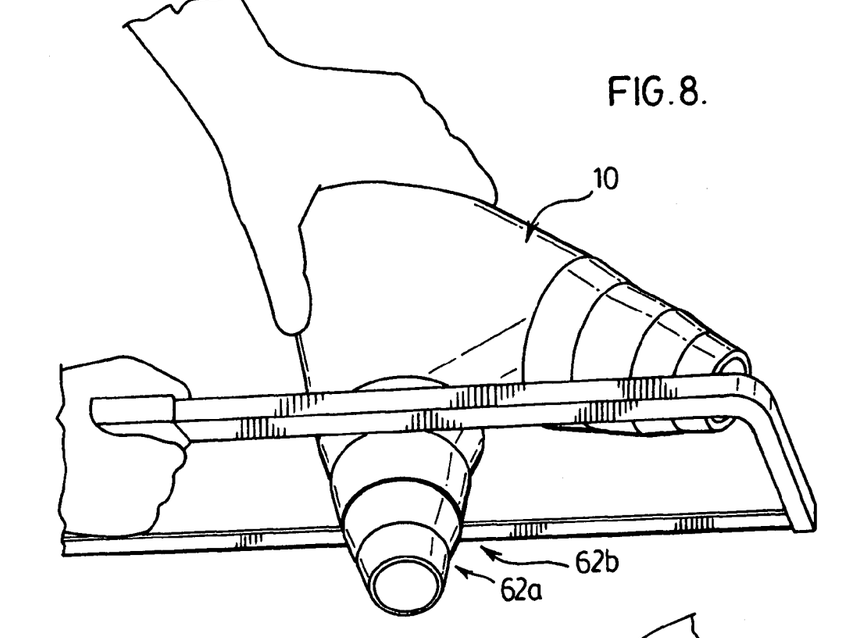
FIGS. 8, 9, 10 and 11 illustrate the installation of the coupling device according to one preferred embodiment.
Figure 9:
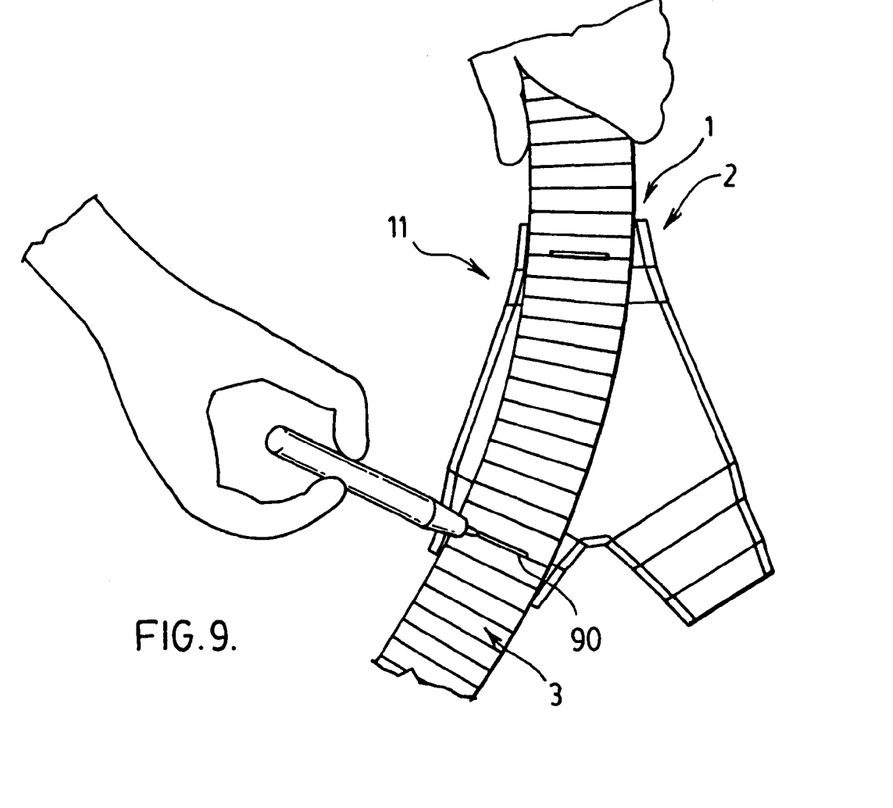
Figures 10, 11:
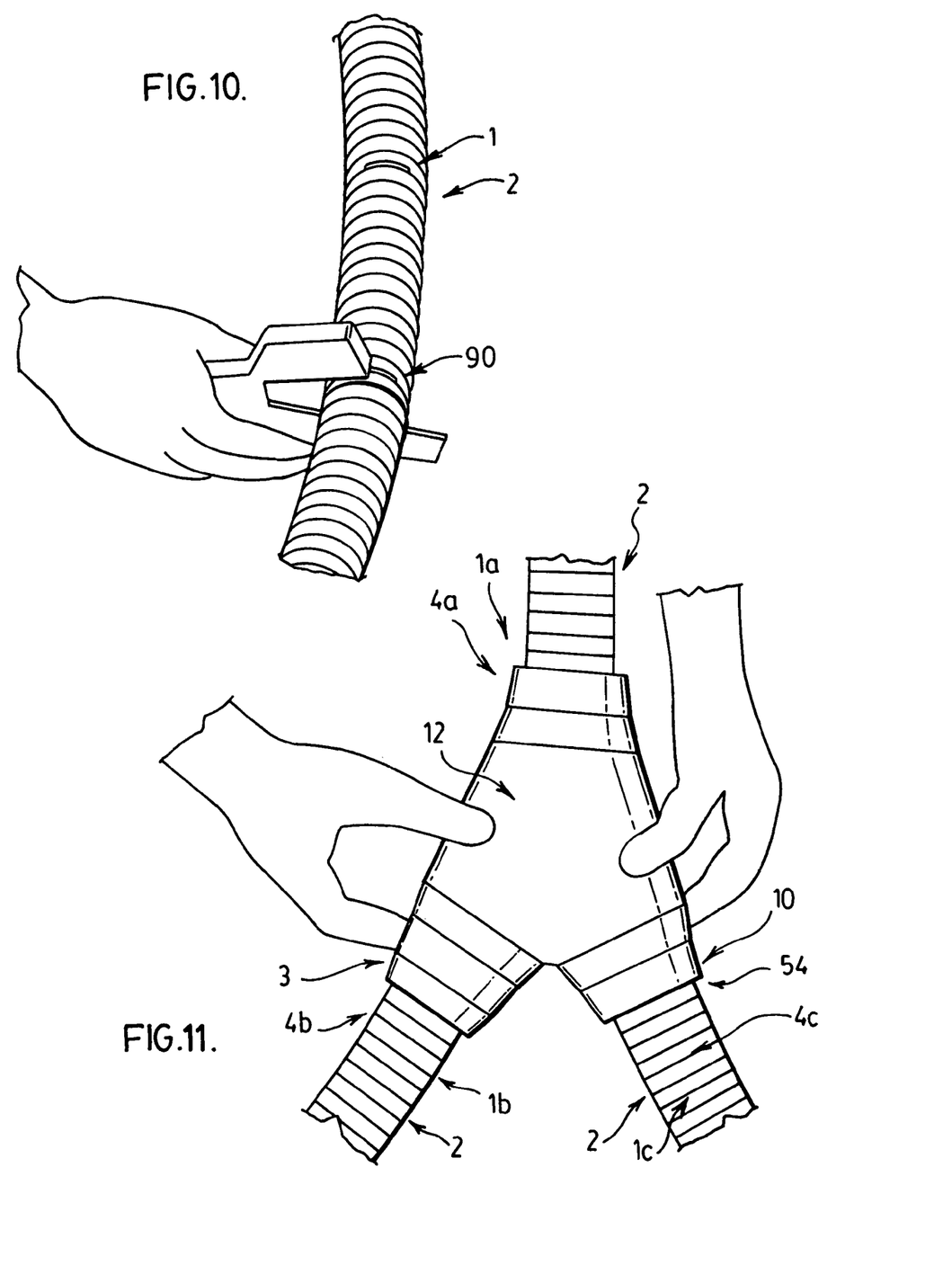

FIGS. 8, 9, 10 and 11 show the installation of the coupling device 10 having three openings 51, 52 and 53 onto corresponding conduits 1a, 1b, and 1c. As illustrated in FIGS. 9, 10, and 11, the conduits 1a, 1b and 1c are preferably corrugated conduits having corrugations 3.

In the preferred embodiment, the coupling device 10 preferably has conical ends 60a, 60b, and 60c and further preferably have pre-scored cut lines 62a to 62d, as shown for instance in FIGS. 1 to 4. In operation, to engage conduits 1 having different diameters, the conical ends 60a, 60b, 60c can be cut at the pre-scored cut lines 62 which correspond to different diameters of conduits 1. In a further preferred embodiment, the preset score lines 62 are located on the conical ends 60a, 60b, 60c at diameters along the conical ends 60 that correspond to different standard outside diameters of conduits 1. In this way, by cutting the conical ends 60a, 60b and 60c in one of the pre-scored cut lines 62, the resulting openings 51, 52, and 53 are then sized to engage with the corresponding conduit 1a, 1b, 1c when the first side 11 is releasably secured to the second side 12.

As illustrated in FIG. 8, for instance, the conical end 60b corresponding to the second opening 52 is being cut, in this example by a saw, along the pre-scored line 62c. In a further preferred embodiment, the pre-scored cut lines 62a to 62d will either mark or identify on the corresponding standard diameter of a corrugated conduit 2 which the cut line 62 corresponds, or, there will be another indication, such as printed or electronic instructions, which pre-scored cut lines 62a to 62d, the person installing the coupling device 10 should cut for the conical end 60 to be sized to engage the corresponding different diameter corrugated conduit 1.

Figure 6:
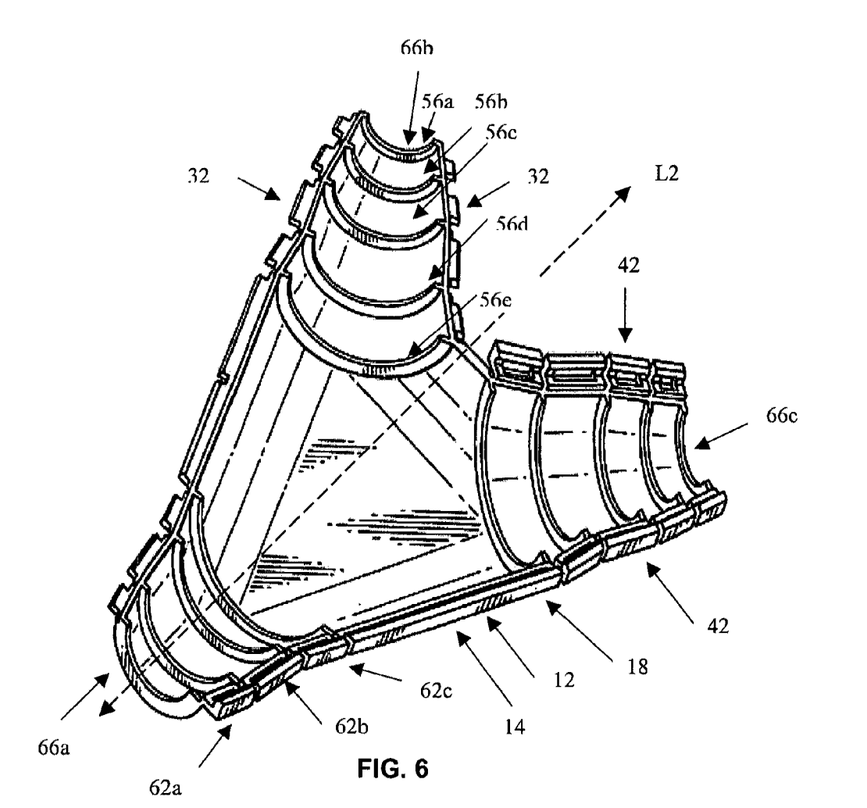
FIG. 6 is a top perspective view of the second side of the coupling device shown in FIG. 2 according to one preferred embodiment.

As illustrated in FIGS. 5 and 6, the conical ends 60a, 60b, 60c preferably have opening ribs 56a, 56b, 56c, 56d and 56e located along the U-shaped channels 64, 66 which are sized to engage a corrugation 3 of a corrugated conduit 2. In this way, the opening ribs 56 facilitate the openings 51, 52, 53 engaging the conduit 1. Preferably, the conduit 1 is a corrugated conduit 2, and the ribs 56 are sized to fit into the corrugation 3 of a corrugated conduit 2. More preferably, the opening ribs 56 are aligned along the centre line $C_1$, $C_2$, $C_3$ at locations which correspond to the pre-scored cut lines 62a to 62d. In this way, the U-shaped channels 64, 66 may be severed at one of the pre-scored lines 62a to 62d which correspond to a diameter of a corresponding corrugated conduit 2. When so severed, the U-shaped channels 64, 66 will then have at their end, one of the corresponding opening ribs 56a to 56e. In this way, when the first side 11 is releasably secured to the second side 12, the opening 51, 52, 53 formed by the U-shaped channels 64, 66 will then have at the opening a rib 56a to 56e which was associated with the pre-scored cut line 62a to 62b. It is understood that the first or smaller strip 56a may not be associated with the pre-scored cut line as the rib 56a will be sized to engage a corrugation 3 of the smallest possible standard diameter corrugated conduit 2 for which the coupling device 10 may be sized and therefore no cutting would be required. Preferably, the corrugated conduit 2 has standard diameters such as 1", 1½", 2", 2½", etc. and each of the pre-scored lines 62a to 62d correspond to one of these standard diameters.

As shown in FIG. 8, the first side 11 can be releasably secured to the second side 12, when the cut is made. Alternatively, the first side 11 and the second side 12 can be cut separately, as they both have pre-scored cut lines 62.

Once the cut is made, the corrugated conduit 2, shown in FIG. 9, is then marked with a marking 90 indicating where it should be cut at both locations. Preferably, at least two corrugations 3 will be located within the coupling device 10 of all of the ends 4 for all of the corrugated conduit 2 to secure the corresponding conduit 1 in the opening 51, 52, 53. As shown in FIG. 9, a single conduit 12 is being cut and one end 4 is entering the first opening 51 and the other end 4 is exiting the second opening 52. In this embodiment, a branching conduit 1c will be placed along the third opening 53 as shown for instance in FIG. 11.

After the corrugated conduit is marked, the corrugated conduit 2 is cut at the markings 90 as shown in FIG. 10. The corrugated conduit 2 shown in FIGS. 9 and 10 may comprise a raceway conduit, which is being branched off with the third conduit 1c shown in FIG. 11. The raceway corrugated conduit 2 may be located in a plenum, riser or general raceway.

Finally, in FIG. 11, the second side 12 is shown releasably secured to the first side 11 after the corresponding conduits 1a, 1b and 1c have been inserted in the U-channels 64a, 64b and 64c. When the second side 12 is pressed against the first side 11, the first snap fitting mechanism 21 will mate with the second snap fitting mechanism 22 to releasably secure the first side 11 to the second side 12, thereby forming the coupling device 10, as shown in FIG. 11 and also as discussed above. As illustrated in FIGS. 8, 9 and 11, the first opening 51, the second opening 52 and third opening 53 will each be sized to engage a corresponding conduit 1a, 1b or 1c, when the first side 11 is releasably secured to the second side 12. In the preferred embodiment illustrated in FIG. 11, the corresponding conduits 1a, 1b and 1c are corrugated conduits 2, such that the first, second and third openings 51, 52 and 53 will be sized to fit into one of the corrugations 3 of the corrugated conduit 2, thereby creating an interference fit 54. As also indicated above, in a preferred embodiment, the openings 51, 52 and 53 are formed of conical ends 60 having pre-scored cut lines 62 to facilitate sizing the openings 51, 52 and 53 to create an interference fit 54 with the corresponding conduit 1a, 1b, 1c. Still more preferably, the openings 51, 52, 53 have ribs 56 at locations on the centre lines $C_1$, $C_2$, $C_3$ which align with a pre-scored cut line 62, such that after the conical ends are cut at a pre-scored cut line 62, the opening 51, 52, 53 with a rib 56 sized to fit into a corrugation of a corresponding corrugated conduit 2.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A coupling system comprising:
   at least two corresponding corrugated conduits, wherein at least one corresponding corrugated conduit has a first diameter and at least one corrugated conduit has a second diameter different from the first diameter; and
   a coupling device to couple the at least two corrugated conduits together, said coupling device comprising:
   a first side having a first snap fitting mechanism;
   a second side having a second snap fitting mechanism, said first snap fitting mechanism mating with the second snap fitting mechanism to releasably secure the first side to the second side and form the coupling device, said coupling device having a main body communicating with a first opening, a second opening and a third opening;
   wherein said first opening, second opening and third opening engage at end of each of the at least two corrugated conduits by fitting into a corrugation near the end of each of the at least two corrugated conduits when the first side is releasably secured to the second side, and
   wherein each of the first opening, the second opening and the third opening have a conical end with pre-scored cut lines aligned with opening ribs along each conical end to permit the conical end to be cut at one of the pre-scored cut lines corresponding to the first diameter or the second diameter, such that the opening ribs having the first diameter or the second diameter engage the corrugation of the at least two corrugated conduits having the first diameter or the second diameter.

2. The coupling system as defined in claim 1 wherein the first side extends along a first longitudinal axis and the second side extends along a second longitudinal axis; and
   wherein the first snap fitting mechanism mates with the second snap fitting mechanism when the first side faces the second side and the first longitudinal axis is aligned with the second longitudinal axis.

3. The coupling system as defined in claim 2 wherein the first opening has a first centre line extending to the main body and the first canter line is substantially aligned with the first longitudinal axis and the second longitudinal axis.

4. The coupling system as defined in claim 3 wherein the second opening has a second centerline and the third opening has a third centerline; and
   wherein the second centerline and the third centerline form an acute angle with respect to the first longitudinal axis and the second longitudinal axis.

5. The coupling system as defined in claim 3 wherein the coupling device is substantially symmetrical about the first longitudinal axis and the second longitudinal axis.

6. The coupling system as defined in claim 1 wherein the first side is substantially identical to the second side.

7. The coupling system as defined in claim 1 wherein the first side extends along a first longitudinal axis and the second side extends along a second longitudinal axis; and
   wherein said first side is substantially symmetrical about the first longitudinal axis and the second side is substantially symmetrical about the second longitudinal axis.

8. The coupling system as defined in claim 7 wherein the first snap fitting mechanism comprises ribs on one side of the first longitudinal axis and the first snap fitting mechanism comprises slots on another side of the first longitudinal axis.

9. The coupling system as defined in claim 1 wherein the first side has a first perimeter and the second side has a second perimeter; and
   wherein the first snap fitting mechanism extends along at least a first portion of the first perimeter and the second snap fitting mechanism extends along at least a second portion of the second perimeter.

10. The coupling system as defined in claim 9 wherein the first snap fitting mechanism comprises a plurality of ribs which mate with a corresponding plurality of slots in the second snap fitting mechanism.

11. The coupling system as defined in claim 1 wherein the first side extends along a first longitudinal axis and the second side extends along a second longitudinal axis;
- wherein the first snap fitting mechanism comprises a first plurality of ribs and a first plurality of slots, separated from the first plurality of ribs by the first longitudinal axis; and
- wherein the first plurality of ribs mate with a corresponding second plurality of slots on the second side and the first plurality of slots mate with a corresponding second plurality of ribs on the second side.

12. The coupling system as defined in claim 11 wherein the first side is substantially identical to the second side.

13. The coupling system as defined in claim 11 at least the first side is sufficiently resilient to permit the first snap fitting mechanism to mate with the second snap fitting mechanism.

14. The coupling system of claim 1, wherein the coupling system is configured to be installed within a building as part of a raceway for protecting cables, wherein the first side of the coupling device is releasable from the second side of the coupling device to facilitate changes in a design of the raceway once installed in the building.

15. The coupling system of claim 1, wherein the coupling system is configured to be installed within a building as part of a raceway for protecting cables, wherein the cables are routed through the at least two corrugated conduits and wherein the first side of the coupling device is releasable from the second side of the coupling device to provide access to the cables in the raceway once installed in the building.

16. A raceway for protecting cables in a building comprising a coupling system according to claim 1, wherein the first side of the coupling device is releasable from the second side of the coupling device to facilitate changes in a design of the raceway once installed in the building.

17. A raceway for protecting cables in a building comprising a coupling system according to claim 1, wherein the cables are routed through the at least two corrugated conduits and wherein the first side of the coupling device is releasable from the second side of the coupling device to provide access to the cables in the raceway once installed in the building.

18. A coupling system comprising:
- at least two corresponding corrugated conduits, wherein at least one corresponding corrugated conduit has a first diameter and at least one corrugated conduit has a second diameter larger than the first diameter; and
- a coupling device to couple the at least two corresponding conduits together, said coupling device comprising:
  - a first side having a first perimeter;
  - a second side, separate from the first side, having a second perimeter;
  - a first snap fitting mechanism extending along at least a first portion of the first perimeter;
  - a second snap fitting mechanism extending along at least a second portion of the second perimeter, said first snap fitting mechanism mating with the second snap fitting mechanism to releasably secure the first side to the second side to form the coupling device, said coupling device having a main body communicating with at least two openings;
- wherein said at least two openings are each sized to create an interference fit with an end of the at least two corresponding conduits when the first side is releasably secured to the second side;
- wherein said at least two openings each form an interference fit with the end of the at least two corresponding corrugated conduits by being sized to have an opening rib fit into a corrugation of the at least two corresponding corrugated conduits; and
- wherein the at least two openings each have a conical end with pre-scored cut lines aligned with corresponding opening ribs along the at least two openings to permit the conical ends to be cut at the first diameter or the second diameter, such that, after the conical ends are cut at one of the pre-scored cut lines aligned with the corresponding opening ribs, the conical ends have opening ribs which engage the corrugation of each of the at least two corresponding corrugated conduits having the first diameter and the second diameter.

19. The coupling system as defined in claim 18 wherein the first side extends along a first longitudinal axis and the second side extends along a second longitudinal axis; and
- wherein the first snap fitting mechanism mates with the second snap fitting mechanism when the first side faces the second side and the first longitudinal axis is aligned with the second longitudinal axis.

20. A method of coupling conduits, said method comprising:
- providing a first side of a coupling device, said first side having a first snap fitting mechanism and at least two U-shaped channels;
- providing a second side of the coupling device, separate from the first side, said second side having a second snap fitting mechanism which mates with the first snap fitting mechanism;
- providing at least two corresponding corrugated conduits, wherein at least one corresponding corrugated conduit has a first conduit diameter and at least one corrugated conduit has a second conduit diameter different from the first conduit diameter, and wherein the at least two U-shaped channels of the first side and the second side are tapered and have pre-scored cut lines corresponding to the first conduit diameter and the second conduit diameter with opening ribs to engage corrugations of the first conduit diameter or the second conduit diameter such that the at least two U-shaped channels form openings sized to create an interference fit with the ends of the at least two corresponding corrugated conduits;
- severing a section of the at least two U-shaped channels of the first side and the second side at the pre-scored cut lines to match one of the first conduit diameter or the second conduit diameter corresponding to each of the at least two corresponding corrugated conduits;
- placing in each U-shaped channel an end of one of the at least two corresponding corrugated conduits; and
- releasably securing the first side to the second side by mating the first snap fit mechanism to the second snap fit mechanism to form the coupling device such that at least the two U-shaped channels of the first side mate with at least two channels of the second side to form at least two openings sized to engage the ends of the at least two corresponding corrugated conduits with the opening ribs of the at least two openings forming the interference fit with the at least two corresponding conduits by having the opening ribs associated with one of the pre-scored lines sized to fit into a corrugation near an end of the at least two corresponding corrugated conduits when the U-shaped channels of the first side and the second side are severed at the pre-cut score line.

21. The method of claim 20 wherein the first side is substantially identical to the second side.

* * * * *